(12) United States Patent
Chung et al.

(10) Patent No.: US 10,313,038 B2
(45) Date of Patent: Jun. 4, 2019

(54) FAST SYNCHRONIZATION SCHEDULING APPARATUS AND METHOD FOR TIME SLOTTED CHANNEL HOPPING IN CONGESTED INDUSTRIAL WIRELESS NETWORK ENVIRONMENT

(71) Applicant: Pusan National University Industry-University Cooperation Foundation, Busan (KR)

(72) Inventors: Sanghwa Chung, Busan (KR); Jaeyoung Kim, Seoul (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 15/770,743

(22) PCT Filed: Nov. 21, 2017

(86) PCT No.: PCT/KR2017/013263
§ 371 (c)(1),
(2) Date: Apr. 24, 2018

(87) PCT Pub. No.: WO2018/124481
PCT Pub. Date: Jul. 5, 2018

(65) Prior Publication Data
US 2019/0075489 A1 Mar. 7, 2019

(30) Foreign Application Priority Data

Dec. 28, 2016 (KR) .................. 10-2016-0181340

(51) Int. Cl.
*H04B 17/318* (2015.01)
*H04J 3/06* (2006.01)
(Continued)

(52) U.S. Cl.
CPC .............. *H04J 3/06* (2013.01); *H04B 17/318* (2015.01); *H04J 3/0694* (2013.01);
(Continued)

(58) Field of Classification Search
None
See application file for complete search history.

(56) References Cited

U.S. PATENT DOCUMENTS

2008/0107071 A1  5/2008 Tsigler et al.
2009/0252053 A1  10/2009 Leith et al.
(Continued)

OTHER PUBLICATIONS

Korean Office Action dated Aug. 6, 2018.
(Continued)

*Primary Examiner* — Kodzovi Acolatse
(74) *Attorney, Agent, or Firm* — Rabin & Berdo, P.C.

(57) ABSTRACT

The present invention provides, on the basis of congestion of a network, an arrangement state of nodes, and a quality of a communication channel, a fast synchronization scheduling apparatus and method for reducing a listening time of a node that desires to join. The fast synchronization scheduling apparatus and method include a radio frequency (RF) transmission and reception module configured to transmit and receive RF signals from nearby channels, a received signal strength indicator (RSSI) reception and storage module configured to receive RSSI values from the RF signals received from the RF transmission and reception module and store the received RSSI values, a channel sorting module configured to measure Channel Quality Estimation (CQE) values of the respective channels by putting the RSSI values of the respective channels received from the RSSI reception and storage module into a CQE formula and to sort the channels in order of highest CQE value (highest channel quality) based on the measured CQE values, and a channel setting and advertisement packet (ADV) reception module
(Continued)

configured to receive an input of a channel having the highest CQE value from the channel sorting module, set the channel, and start a listening operation to receive an ADV in the set channel.

5 Claims, 9 Drawing Sheets

(51) Int. Cl.
    *H04W 28/02*     (2009.01)
    *H04W 28/06*     (2009.01)
    *H04W 56/00*     (2009.01)
    *H04W 72/04*     (2009.01)
    *H04J 3/10*     (2006.01)

(52) U.S. Cl.
    CPC ....... *H04W 28/0284* (2013.01); *H04W 28/06* (2013.01); *H04W 56/001* (2013.01); *H04W 72/0446* (2013.01); *H04J 3/10* (2013.01)

(56) References Cited

U.S. PATENT DOCUMENTS

| | | | | |
|---|---|---|---|---|
| 2014/0086081 A1* | 3/2014 | Mack | ................... | H04L 5/006 370/252 |
| 2014/0369234 A1* | 12/2014 | Vleugels | ............... | H04W 48/14 370/254 |
| 2015/0244415 A1 | 8/2015 | Shudark et al. | | |
| 2016/0020967 A1* | 1/2016 | Thubert | .................. | H04L 43/06 370/252 |
| 2016/0072548 A1* | 3/2016 | Shih | ..................... | H04B 1/7143 375/134 |
| 2016/0174192 A1 | 6/2016 | Raghu et al. | | |
| 2016/0270068 A1* | 9/2016 | Akyurek | ............... | H04W 72/04 |
| 2017/0094693 A1* | 3/2017 | Law | ..................... | H04W 8/005 |
| 2018/0077535 A1* | 3/2018 | Todeschini | ............. | H04W 4/04 |
| 2018/0242266 A1* | 8/2018 | Xhafa | ................. | H04W 56/001 |

OTHER PUBLICATIONS

Rasool Tavakoli et al., "Enhanced Time-Slotted Channel Hopping in WSNs using Non-Intrusive Channel-Quality Estimation", 2015 IEEE 12$^{th}$ International Conference on Mobile Ad Hoc and Sensor Systems, pp. 217-225.

Peng Du, "Spectrum-aware Adaptive Communication for the Internet of Things", School of Computer Science & Information Systems; Birkbeck College, University of London; Jan. 2014.

* cited by examiner

FIG. 1

| ADV | RPT | ..... | Additory ADV | ..... | Additory ADV | ..... | NF | NF |
|---|---|---|---|---|---|---|---|---|

FIG. 6

FAST SYNCHRONIZATION SCHEDULING APPARATUS AND METHOD FOR TIME SLOTTED CHANNEL HOPPING IN CONGESTED INDUSTRIAL WIRELESS NETWORK ENVIRONMENT

TECHNICAL FIELD

The present invention relates to a Time Slotted Channel Hopping (TSCH) scheme, which is a Time Division Multiple Access (TDMA)-based Medium Access Control (MAC) protocol, and more particularly, to a fast synchronization scheduling apparatus and method for, on the basis of congestion of a network, an arrangement state of nodes, and a quality of a communication channel, reducing a listening time of nodes that desire to join.

BACKGROUND ART

Today, the Internet of Things (IoT) is considered a technology that is the most widely used in real life. In IoT, seamless data transmission and energy efficiency are important, and thus a low power network technology, such as a wireless sensor network, plays a crucial role. Also, in industry, a technology referred to as the Industrial Internet of Things (IIoT) has emerged as a new trend.

In the early 2000s, significant development occurred on ISA100.11a, Wireless HART, and other wireless technology standards, which have expandability and efficiency, that were suitable for industrial environments with numerous restrictive requirements. WirelessHART is a technology that has greatly improved the reliability and stability of wireless communication technologies, and WirelessHART employs Time Slotted Channel Hopping (TSCH) Media Access Control (MAC) protocol on the basis of the IEEE 802.15.4 standard. In 2012, the TSCH MAC protocol used in WirelessHART was adopted as a standard technology by being included in an IEEE 802.15.4e MAC amendment that improved on constraints of the existing IEEE 802.15.4-2006 standard. The IEEE 802.15.4e standard belongs to the license-free 2.4 GHz (Industrial Scientific and Medical) ISM band and is divided into 16 separate channels for use.

In the TSCH MAC protocol, nodes across a network are synchronized in time, enabling start times of slotframes to be matched and channel hopping information to be shared. The slotframe is repeated during an operation time, and a single slotframe includes a plurality of time slots. sleep, translate, and receive operations are performed for a single time slot. Channel hopping is a technology for transmitting and receiving data by varying the frequency used in each time slot, and which is provided to resolve problems associated with congestion.

Among steps of configuring the entire topology in the TSCH MAC protocol, there is a step of joining a synchronization for a network configuration. New nodes desiring to join the network need to receive an advertisement packet (ADV) that contains scheduling information that is transmitted by nodes that have already joined the network and required for the synchronization.

In order to use scheduling technology and channel hopping technology, which operate in the TSCH MAC, the synchronization technology is the essential and important factor. A node to join a network does not know scheduling information of the network until listening to the ADV message, and thus are limitlessly kept in a listening state. This lowers the energy efficiency of small devices that operate on batteries, shortening the period of actual operation, which can cause serious maintenance problems.

In order to enhance the productivity efficiency in a basic industrial environment, wireless communication is widely used. Wireless data exchanges for automation have been more frequently taking place. Most of the wireless communications used herein share a 2.4 GHz ISM band with each other, and interference caused by human and equipment movement may limitlessly extend a waiting state of a node that is listening in a particular channel.

In order to meet the reliability and stability, which are the most important characteristics in an industrial wireless network, there is need for a faster and more flexible synchronization strategy according to channel status and change.

DISCLOSURE

Technical Problem

The present invention is directed to providing a fast synchronization scheduling apparatus and method capable of, on the basis of network congestion, an arrangement state of nodes, and a quality of a communication channel, reducing a listening time of a node desiring to join.

The technical objectives of the present invention are not limited to those disclosed above, and other objectives may become apparent to those of ordinary skill in the art on the basis of the following description.

Technical Solution

One aspect of the present invention provides a fast synchronization scheduling apparatus for Time Slotted Channel Hopping (TSCH) in a congested industrial wireless network environment, the fast synchronization scheduling apparatus including: a radio frequency (RF) transmission and reception module configured to transmit and receive RF signals from nearby channels; a received signal strength indicator (RSSI) reception and storage module configured to receive RSSI values from the RF signals received from the RF transmission and reception module and store the received RSSI values; a channel sorting module configured to measure Channel Quality Estimation (CQE) values of the respective channels by putting the RSSI values of the respective channels received from the RSSI reception and storage module 20 into a CQE formula, and sort the channels in order of highest CQE value (highest channel quality) based on the measured CQE values; and a channel setting and advertisement packet (ADV) reception module configured to receive an input of a channel having the highest CQE value from the channel sorting module, set the channel, and start a listening operation to receive an ADV in the set channel.

The channel sorting module may use, as a method of measuring the CQE value (channel quality), a Channel Quality Estimation method based on a received signal strength indicator (RSSI).

Another aspect of the present invention provides a fast synchronization scheduling apparatus for TSCH in a congested industrial wireless network environment, the fast synchronization scheduling apparatus including: a RF transmission and reception module configured to transmit and receive RF signals from nearby channels; an information collector configured to receive ADVs and RSSI values from the RF signals received from the RF transmission and reception module and measure CQE values of the respective channels by putting the RSSI values of the respective channels into a CQE formula, and collect information about a number of coordinators and information about a good group; and an ADV packet generator and scheduler configured to deliver information about a number of coordinators and a number of allocated ADV slots to a PAN coordinator on the basis of the information about the number of the coordinators and the information about the good group that are collected from the information collector, and upon receiving an answer, generate an ADV message and transmit the generated ADV message in a channel designated for each coordinator.

The information collector may include: a RSSI reception and storage module configured to receive the RSSI values from the RF signals received from the RF transmission and reception module and store the received RSSI values; an ADV receiver configured to receive the ADV received from the RF transmission and reception module and identify a number of other coordinators; a channel sorting module configured to measure CQE values of the respective channels by putting the RSSI values of the respective channels received from the RSSI reception and storage module into a CQE formula, and sort the channels in order of highest CQE value (highest channel quality) based on the measured CQE values; and an algorithm determiner configured to set a number of coordinators and a good group by using the ADV, the number of coordinators, and the CQE values that are identified from the ADV receiver and the channel sorting module, and select channels having a high CQE value.

The algorithm determiner may include: a channel selecting module configured to select, on the basis of a predetermined threshold value, a channel that is determined not to be congested among the channels sorted in order of highest CQE value by the channel sorting module; and a group setting module configured to set the number of coordinators and the good group that are measured by the ADV receiver.

The ADV packet generator and scheduler may include: an ADV slot allocation requesting module configured to deliver information about the number of coordinators set by the algorithm determiner (240) and the number of the allocated ADV slots to the PAN coordinator; and an ADV information generating module configured to receive an answer from the PAN coordinator on the basis of the information delivered from the ADV slot allocation requesting module, generate an ADV message, and transmit the generated ADV message in a designated channel.

The PAN coordinator may serve to perform, on an entire topology that accords with allocation of ADV slots, scheduling on the basis of the good group and the number of coordinators.

Another aspect of the present invention provides a fast synchronization scheduling apparatus for TSCH in a congested industrial wireless network environment, the fast synchronization scheduling apparatus including: a RF transmission and reception module configured to receive information about a good group and information about nearby coordinators with respect to each coordinator from an information collector; a coordinator number calculating module configured to calculate a number of coordinators that share a communication distance with each coordinator on the basis of the information received from the RF transmission and reception module; a good group channel calculating module configured to calculate a number of channels classified as being part of the good group on the basis of a CQE value included in the information transmitted from the RF transmission and reception module; and a control message scheduling module configured to compare the number of channels classified as being part of the good group with the calculated number of the coordinators, allocate a channel to each coordinator on the basis of a result of the comparison, and deliver information about the allocation to the RF transmission and reception module such that the information about the allocation is transmitted to each coordinator in a wireless manner.

Another aspect of the present invention provides a fast synchronization scheduling method for TSCH in a congested industrial wireless network environment, the fast synchronization scheduling method including steps of: (a) measuring, by an RSSI reception and storage module, whether an RSSI value is found to exist in each of channels received from a RF transmission and reception module; (b) detecting, by using the RF transmission and reception module again, an RSSI value from each of the channels when not even one RSSI value is found to exist among all the channels as a result of the measurement; (c) detecting RSSI values from two of all the channels when an RSSI value is found to exist in each of the channels as a result of the measurement; (d) measuring, by a channel sorting module, CQE values of the respective channels by putting the RSSI values of the respective channels into a CQE formula, and sorting the channels in an order of the highest CQE value (a highest channel quality) based on the measured CQE values; (e) receiving, by a channel setting and ADV reception module, an input of a channel that has been sorted by the channel sorting module and determined to have the highest CQE value, and starting a listening operation to receive an ADV in the channel; and (f) selecting, when an ADV is not received by the time a predetermined number of slotframes have passed, a channel having the highest CQE value again on the basis of CQE values collected by that time, and returning to step (c) and proceeding with the subsequent steps.

Another aspect of the present invention provides a fast synchronization scheduling method for TSCH in a congested industrial wireless network environment, the fast synchronization scheduling method including steps of: (a) measuring, by a RSSI reception and storage module, whether an RSSI value is found to exist in each of channels received from a radio frequency (RF) transmission and reception module 100; (b) detecting, by using the RF transmission and reception module again, an RSSI value from each of the channels when not even one RSSI value is found to exist among all the channels as a result of the measurement; (c) detecting RSSI values from two of all the channels when an RSSI value is found to exist in each of the channels as a result of the measurement; (d) measuring, by a channel sorting module, CQE values of the respective channels by putting the received RSSI values of the respective channels into a CQE formula, and sorting the channels in an order of the highest CQE value (a highest channel quality) based on the measured CQE values; (e) searching for other coordinators in a surrounding area using an ADV received from an ADV receiver, setting a number of the found coordinators and a good group, and delivering information about channels having high CQE values to a PAN coordinator; and (f) when a time slot for an ADV is allocated to each coordinator on the basis of the information delivered from the PAN coordinator and timeslot information is received by the coordinator, generating an ADV message and transmitting the generated ADV message in a designated channel during the time slot; and (g) selecting, when an ADV is not received by the time a predetermined number of slotframes have passed, a channel having the highest CQE value again on the basis of CQE values collected by that time, and returning to step (c) and proceeding with the subsequent steps.

Step (f) may include: a first calculating step of calculating, by a good group channel calculating module, a number of channels classified as being part of the good group on the basis of the CQE value when it is determined that the number of coordinators calculated by a coordinator number calculating module is one; a step of, when the number of channels obtained as a result of the first calculating step is in a range of one to three, allocating a number of channels (ADV slots) corresponding to the number of channels obtained as the result of the first calculating step, and delivering information about the allocation to the coordinator; a second calculating step of calculating, by the good group channel calculating module, a number of channels classified as being part of the good group on the basis of the CQE value when it is determined that the number of coordinators calculated by the coordinator number calculating module is two; a step of, when the number of channels obtained as a result of the second calculating step is one, having the channel (an ADV slot) be primarily allocated to a coordinator with a lower numbered coordinator ID, and delivering information about the allocation to the coordinator; a step of, when the number of channels obtained as a result of the second calculating step is two, having the channels be respectively allocated to the two coordinators, and delivering information about the allocation to the coordinators; a step of, when the number of channels obtained as a result of the second calculating step is three, having two of the channels be allocated to a coordinator with a lower numbered coordinator ID, and having the one remaining channel be allocated to the remaining coordinator, and delivering information about the allocation to the coordinators; a step of, when the number of coordinators calculated by the coordinator number calculating module is three or more, comparing the number of coordinators with the number of channels in the good group; a step of, when the number of the channels in the good group is smaller than the number of the coordinators as a result of the comparing, having the channels in the good group be allocated to the coordinators in order of lowest numbered coordinator ID, and delivering information about the allocation to the coordinators; and a step of, when the number of the channels in the good group is larger than or equal to the number of the coordinators as the result of the comparing, having one channel allocated to one coordinator such that ADV messages are simultaneously transmitted in a plurality of channels, and delivering information about the allocation to the coordinators.

When the number of channels obtained as a result of the first calculating step is four or more, the method may include allocating three channels as the three channels with the highest qualities (highest CQE values) among the four channels to the coordinator, and delivering information about the allocation to the coordinator.

When the number of channels obtained as a result of the second calculating step is four or more, the method may include allocating three channels that are ranked as the three channels with the highest qualities (highest CQE values) among the four channels to the coordinators and not using the remaining channel.

Advantageous Effects

The fast synchronization scheduling apparatus and method for Time Slotted Channel Hopping (TSCH) in a congested industrial wireless network environment according to the present invention provide the following advantageous effects.

First, since nodes desiring to join, according to channel quality, a network are able to switch channels, the present invention can be applied to a congested or frequently changing industrial wireless environment.

Second, since advertisement packets (ADVs) are more frequently sent in a channel in which nodes desiring to join are congested, nodes desiring to join a network can be more rapidly synchronized, thus enabling a faster topology configuration and data exchange.

Third, since the present invention schedules ADV messages and operates according to the number of nearby coordinators, congestion and interference due to collision of ADV messages in the same channel can be reduced.

DESCRIPTION OF DRAWINGS

FIG. 1 is a slotframe for measuring a quality of a channel, which is proposed in the thesis.

FIG. 6 is a slotframe having an advertisement packet (ADV) slot added thereto.

MODES OF THE INVENTION

The above and other objects, features and advantages of the present invention will become more apparent to those of ordinary skill in the art by describing exemplary embodiments thereof in detail with reference to the accompanying drawings.

Hereinafter, embodiments of a fast synchronization scheduling apparatus and method in a congested industrial wireless network environment according to the present invention will be described with reference to the accompanying drawings. However, the present invention is not limited to such embodiments, and the present invention may be realized in various forms. The embodiments to be described below are only embodiments provided to complete the disclosure of the present invention and assist those skilled in the art to completely understand the scope of the present invention. Therefore, the embodiments set forth herein and illustrated in the configuration of the present invention are only the most preferred embodiments and are not representative of the full the technical spirit of the present invention, so it should be understood that they may be replaced with various equivalents and modifications.

The present invention describes a fast synchronization apparatus and method using a channel quality measurement, in which, since an operation method in a node desiring to join a network, an operation method in a coordinator that transmits an advertisement packet (ADV) message, and an operation method in a Personal Area Network (PAN) coordinator that identifies all pieces of information about coordinators and schedules the coordinators are different from each other, their respective operation methods will be separately described.

First Embodiment

Figure 2:
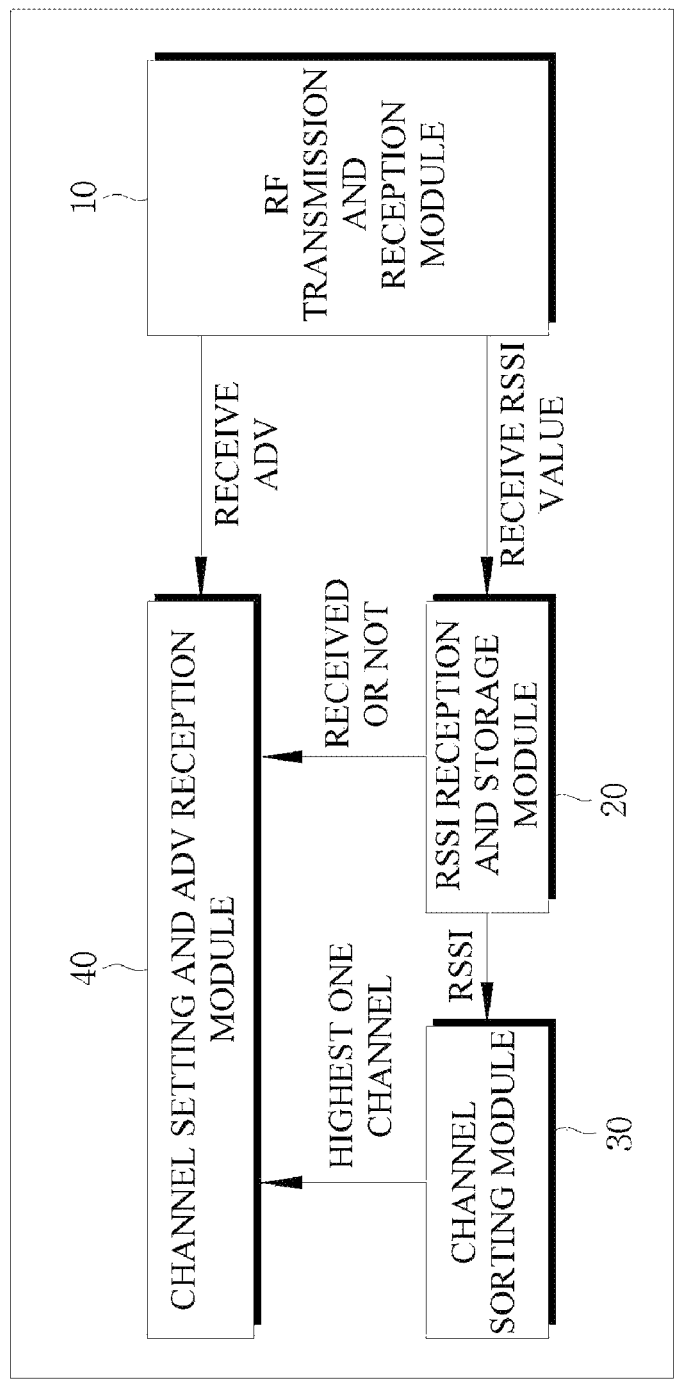
FIG. 2 is a block diagram illustrating a configuration of a fast synchronization scheduling apparatus for Time Slotted Channel Hopping (TSCH) applied in a node that desires to join a network in a congested industrial wireless network environment according to an embodiment of the present invention.

FIG. 2 is a block diagram illustrating a configuration of a fast synchronization scheduling apparatus for Time Slotted Channel Hopping (TSCH applied in a node that desires to join a network in a congested industrial wireless network environment according to an embodiment of the present invention.

As shown in FIG. 2, the scheduling apparatus applied in a node desiring to join a network includes a radio frequency (RF) transmission and reception module 10 configured to transmit and receive RF signals from nearby channels, a received signal strength indicator (RSSI) reception and storage module 20 configured to receive RSSI values from the RF signals received from the RF transmission and reception module 10 and store the received RSSI values, a channel sorting module 30 configured to measure Channel Quality Estimation (CQE) values of the respective channels by putting the RSSI values of the respective channels received from the RSSI reception and storage module 20 into a CQE formula of Equation 1 as shown below and to sort the channels in order of highest CQE value (that is, highest channel quality) based on the measured CQE values, and a channel setting and ADV reception module 40 configured to receive an input of a channel having the highest CQE value from the channel sorting module 30, set the channel, and start a listening operation to receive an ADV in the set channel.

In this case, the channel sorting module 30 uses a Channel Quality Estimation method based on RSSI as a method of measuring a CQE value (a channel quality).

Figure 1:
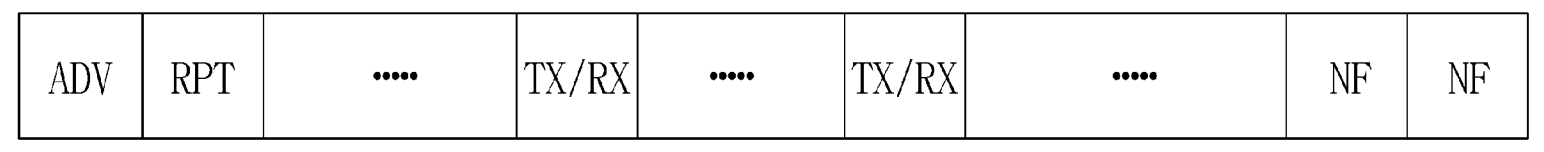

FIG. 1 is a slotframe for measuring a quality of a channel, which is proposed in the thesis, in which an RSSI value of a channel is measured in a slot NF in the rear side of the slotframe, and a channel quality value is shared between coordinators by using a slot RPT in a front side of the slotframe, allowing the channel quality to be the same over the entire topology.

Equation 1 is a formula that is used for evaluation of a channel quality, and c is a number of a channel, NE[c] is a current RSSI value of the channel, and $QE[c]_{k-1}$ is a channel quality that is finally calculated and stored. The first $QE[c]_k$ has a value of NE[c] as it is, and after that, $QE[e]_{k-1}$ and NE[c] are subject to correction using an appropriate weight value.

$$QE[c]_k = \begin{cases} NF[c] & \text{if } k = 0 \\ \alpha QE[c]_{k-1} + (1-\alpha)NF[c]_k & \text{if } k \in [1, \infty) \end{cases} \quad \text{[Equation 1]}$$

$$c \in [11, 26], \quad \alpha \in [0, 1]$$

Hereinafter, a fast synchronization scheduling method for TSCH applied in a node that desires to join a network in a congested industrial wireless network environment having the above configuration according to the present invention will be described.

Figure 3:
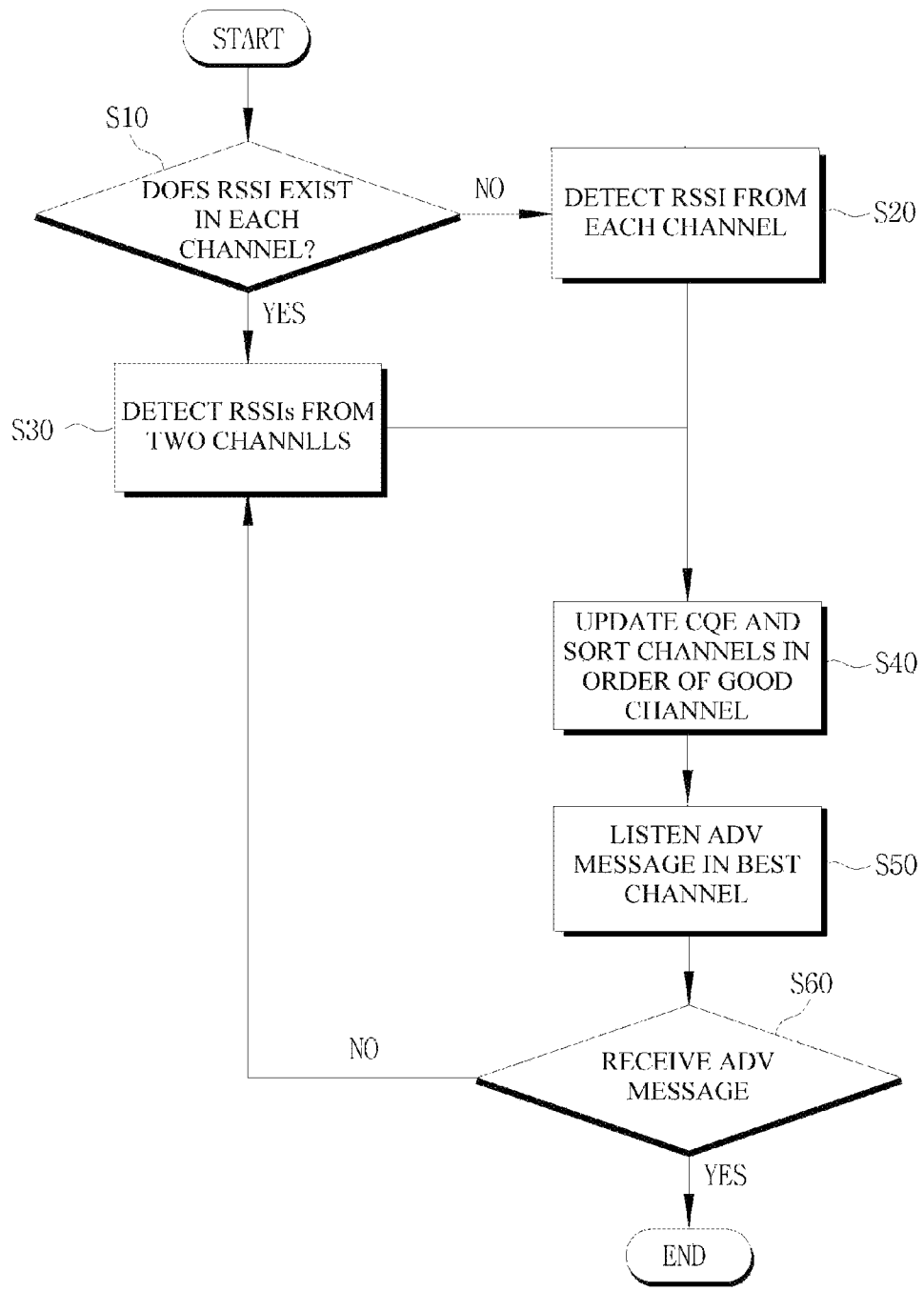
FIG. 3 is a flow chart showing a fast synchronization scheduling method for TSCH applied in a node that desires to join a network in a congested industrial wireless network environment according to an embodiment of the present invention.

FIG. 3 is a flow chart showing a fast synchronization scheduling method for TSCH applied in a node that desires to join a network in a congested industrial wireless network environment according to an embodiment of the present invention.

Referring to FIG. 3, first, the RSSI reception and storage module 20 measures whether an RSSI value is found to exist in each channel (channel number 11 to channel number 26) received by the RF transmission and reception module 10 (S10).

Then, when not even one RSSI value is found to exist among all the channels as a result of the measurement in Operation S10, the RF transmission and reception module 10 detects an RSSI value again from each of the channels (S20). In addition, RSSI values are detected from two of all the channels when an RSSI value is found to exist in each of the channels as a result of the measurement in Operation S10 (S30).

Then, the channel sorting module 30 measures CQE values of the respective channels by putting the RSSI values of the respective channels into a CQE formula of Equation 1, and sorts the channels in order of highest CQE value (that is, highest channel quality) based on the measured CQE values (S40).

The channel setting and ADV reception module 40 receives an input of a channel that is sorted by the channel sorting module 30 and determined to have the highest CQE value, and starts a listening operation to receive an ADV in the channel (S50). When an ADV is not received by the time four slotframes have passed, a channel having the highest CQE value is selected again on the basis of CQE values collected by that time, and the operation 30 are repeated. (S60).

Second Embodiment

Figure 4:
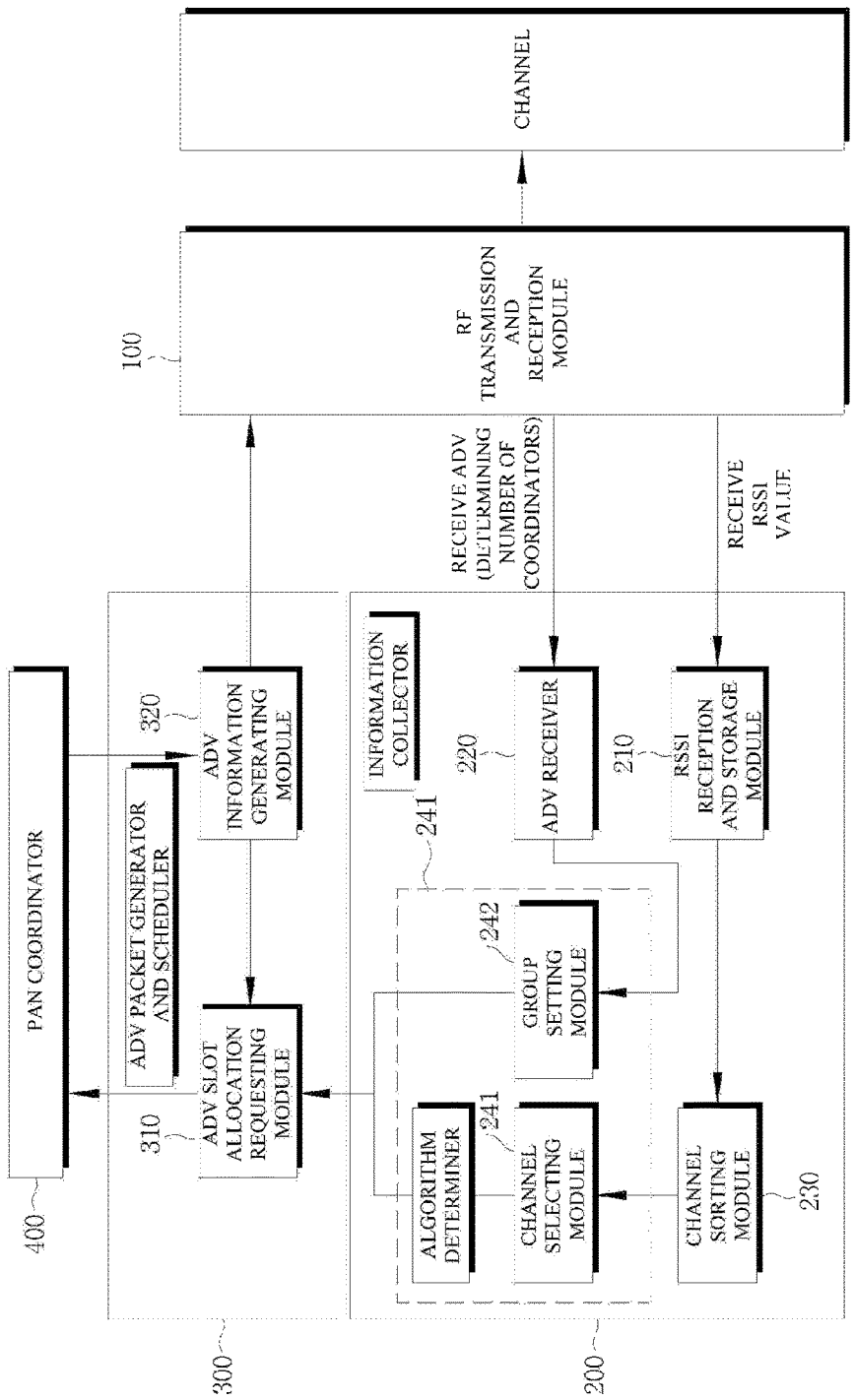
FIG. 4 is a block diagram illustrating a configuration of a fast synchronization scheduling apparatus for TSCH applied in a coordinator in a congested industrial wireless network environment according to an embodiment of the present invention.

FIG. 4 is a block diagram illustrating a configuration of a fast synchronization scheduling apparatus for TSCH applied in a coordinator in a congested industrial wireless network environment according to an embodiment of the present invention.

As shown in FIG. 4, the scheduling apparatus applied in a coordinator includes a radio frequency (RF) transmission and reception module 100 configured to transmit and receive RF signals from nearby channels; an information collector 200 configured to receive ADVs and RSSI values from the RF signals received from the RF transmission and reception module 100, measure Channel Quality Estimation (CQE) values of the respective channels by putting the RSSI values into the CQE formula of Equation 1, and collect information about the number of coordinators and information about a good group; and an ADV packet generator and scheduler 300 configured to deliver information about the number of coordinators and the number of allocated ADV slots to a PAN coordinator 400 on the basis of the information about the number of the coordinators and the information about the good group collected from the information collector 200, and upon receiving an answer, to generate an ADV message and transmit the generated ADV message in a channel designated for each coordinator.

In this case, the information collector 200 includes an RSSI reception and storage module 210 configured to receive the RSSI values from the RF signals received from the RF transmission and reception module 100 and store the received RSSI values, an ADV receiver 220 configured to receive the ADV received from the RF transmission and reception module 100 and identify the number of other coordinators, a channel sorting module 230 configured to measure CQE values of the respective channels by putting the RSSI values of the respective channels received from the RSSI reception and storage module 210 into the CQE formula of Equation 1 and to sort the channels in order of highest CQE value (that is, highest channel quality) based on the measured CQE values, and an algorithm determiner 240 configured to set the number of coordinators and a good group by using the ADV, the number of the coordinators, and the CQE values that are identified from the ADV receiver 220 and the channel sorting module 230 and to select channels having high CQE values.

The algorithm determiner 240 includes a channel selecting module 241 configured to select a channel that is determined not to be congested, on the basis of a value of −70 bBm, among the channels sorted in order of highest CQE value by the channel sorting module 230, and a group setting module 242 configured to set the number of coordinators and the good group that are measured by the ADV receiver 220.

The ADV packet generator and scheduler 300 includes an ADV slot allocation requesting module 310 configured to deliver information about the number of coordinators set by the algorithm determiner 240 and the number of the allocated ADV slots, which are set by the algorithm determiner 240, to the PAN coordinator 400, and an ADV information generating module 320 configured to receive an answer from the PAN coordinator 400 on the basis of the information delivered from the ADV slot allocation requesting module 310, generate an ADV message, and transmit the generated ADV message in a designated channel.

Figure 6:
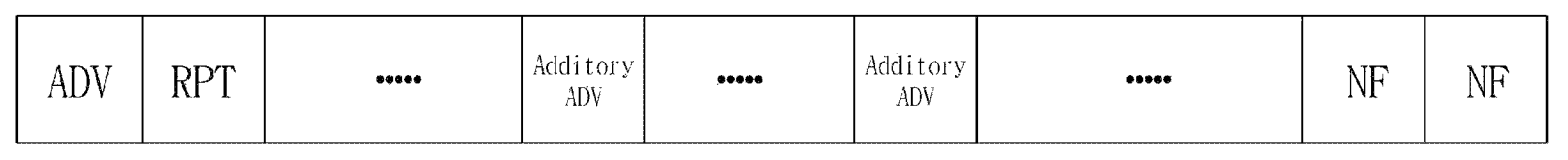

FIG. 6 is a slotframe having an ADV slot added thereto. The ADV information generating module 320 respectively transmits ADV messages in the channels, which have been allocated by the PAN coordinator, in timeslots that are not used for Tx/Rx, on the basis of the slotframe.

In this case, the PAN coordinator 400 serves to perform, on the entire topology that accord with allocation of ADV slots, scheduling on the basis of the good group and the number of coordinators.

Hereinafter, a fast synchronization scheduling method for TSCH applied in a coordinator in a congested industrial wireless network environment having the above configuration according to the present invention will be described.

Figure 5:
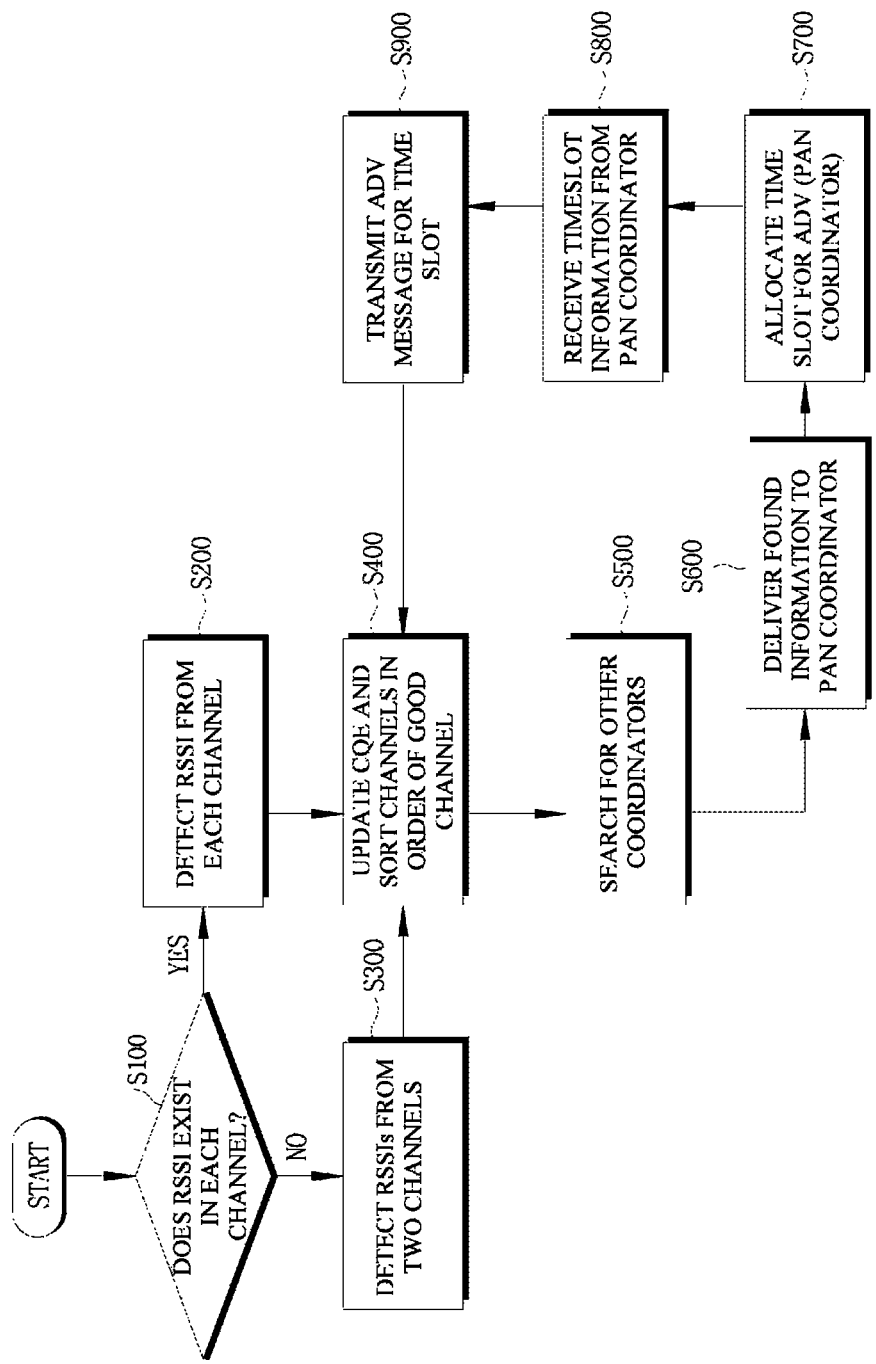
FIG. 5 is a flowchart showing a fast synchronization scheduling method for TSCH applied in a coordinator in a congested industrial wireless network environment according to an embodiment of the present invention.

FIG. 5 is a flowchart showing a fast synchronization scheduling method for TSCH applied in a coordinator in a congested industrial wireless network environment according to an embodiment of the present invention.

Referring to FIG. 5, first, the RSSI reception and storage module 210 measures whether an RSSI value is found to exist in each channel (channel number 11 to channel number 26) received by the RF transmission and reception module 100 (S100).

Then, when not even one RSSI value is found to exist among all the channels as a result of the measurement in Operation S100, the RF transmission and reception module 100 detects an RSSI value again from each of the channels (S200). In addition, RSSI values are detected from two of all the channels when an RSSI value is found to exist in each of the channels as a result of the measurement in S100 (S300).

Then, the channel sorting module 230 measures CQE values of the respective channels by putting the received RSSI values of the respective channels into the CQE formula of Equation 1, and sorts the channels in order of highest CQE value (that is, highest channel quality) based on the measured CQE values (S400).

Whether other coordinators are located in a surrounding area is searched for using an ADV received from the ADV receiver 220 (S500), the number of the found coordinators and a good group are set, and information about channels having high CQE values is delivered to the PAN coordinator 400 (S600).

When a time slot for an ADV is allocated to each coordinator on the basis of the information delivered from the PAN coordinator 400 (S700) and timeslot information is received by the coordinator (S800), an ADV message is generated and the generated ADV is transmitted in a designated channel during the time slot (S900). Operation S700 will be described in detail with reference to FIG. 8.

Then, when an ADV is not received by the time four slotframes have passed, a channel having the highest CQE value is selected again on the basis of CQE values collected by that time, and the method proceeds with the operation S400 is repeated.

Third Embodiment

Figure 7:
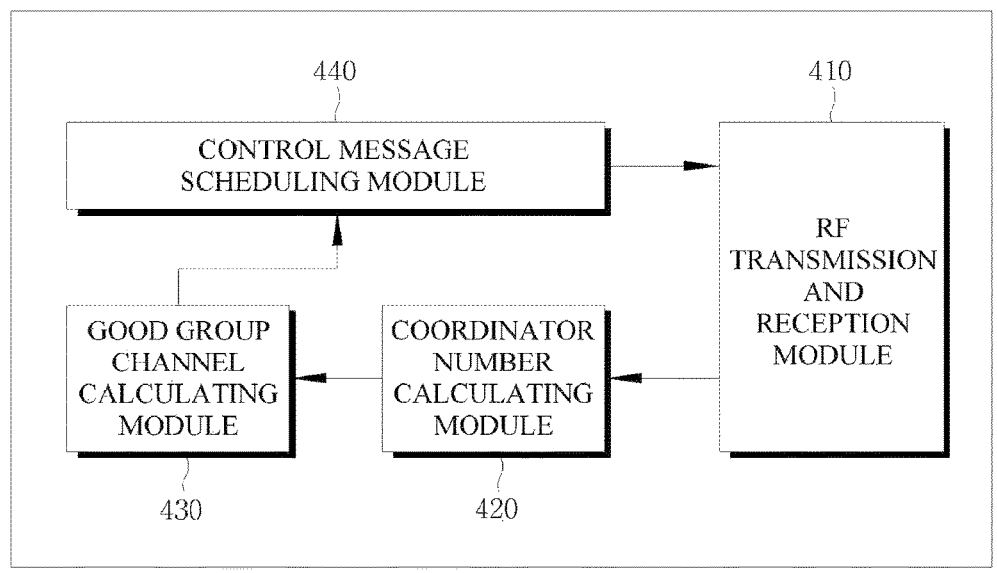
FIG. 7 is a block diagram illustrating a configuration of a fast synchronization scheduling apparatus for TSCH applied in a Personal Area Network (PAN) coordinator in a congested industrial wireless network environment according to an embodiment of the present invention.

FIG. 7 is a block diagram illustrating a configuration of a fast synchronization scheduling apparatus for TSCH applied in a PAN coordinator in a congested industrial wireless network environment according to an embodiment of the present invention.

As shown in FIG. 7, the fast synchronization scheduling apparatus for TSCH applied in a PAN coordinator includes a RF transmission and reception module 410 configured to receive information about a good group and information about nearby coordinators with respect to each coordinator from an information collector 200, a coordinator number calculating module 420 configured to calculate the number of coordinators that share a communication distance with each coordinator on the basis of the information received from the RF transmission and reception module 410, a good group channel calculating module 430 configured to calculate the number of channels classified as being part of the good group on the basis of a CQE value included in the information transmitted from the RF transmission and reception module 410, and a control message scheduling module 440 configured to compare the number of channels classified as being part of the good group with the calculated number of the coordinators, allocate a channel to each coordinator on the basis of a result of the comparison, and deliver information about the allocation to the RF transmission and reception module 410 such that the information about the allocation is transmitted to each coordinator.

Hereinafter, a fast synchronization scheduling method for TSCH applied in a PAN coordinator in a congested industrial wireless network environment having the above configuration according to the present invention will be described.

Figure 8:
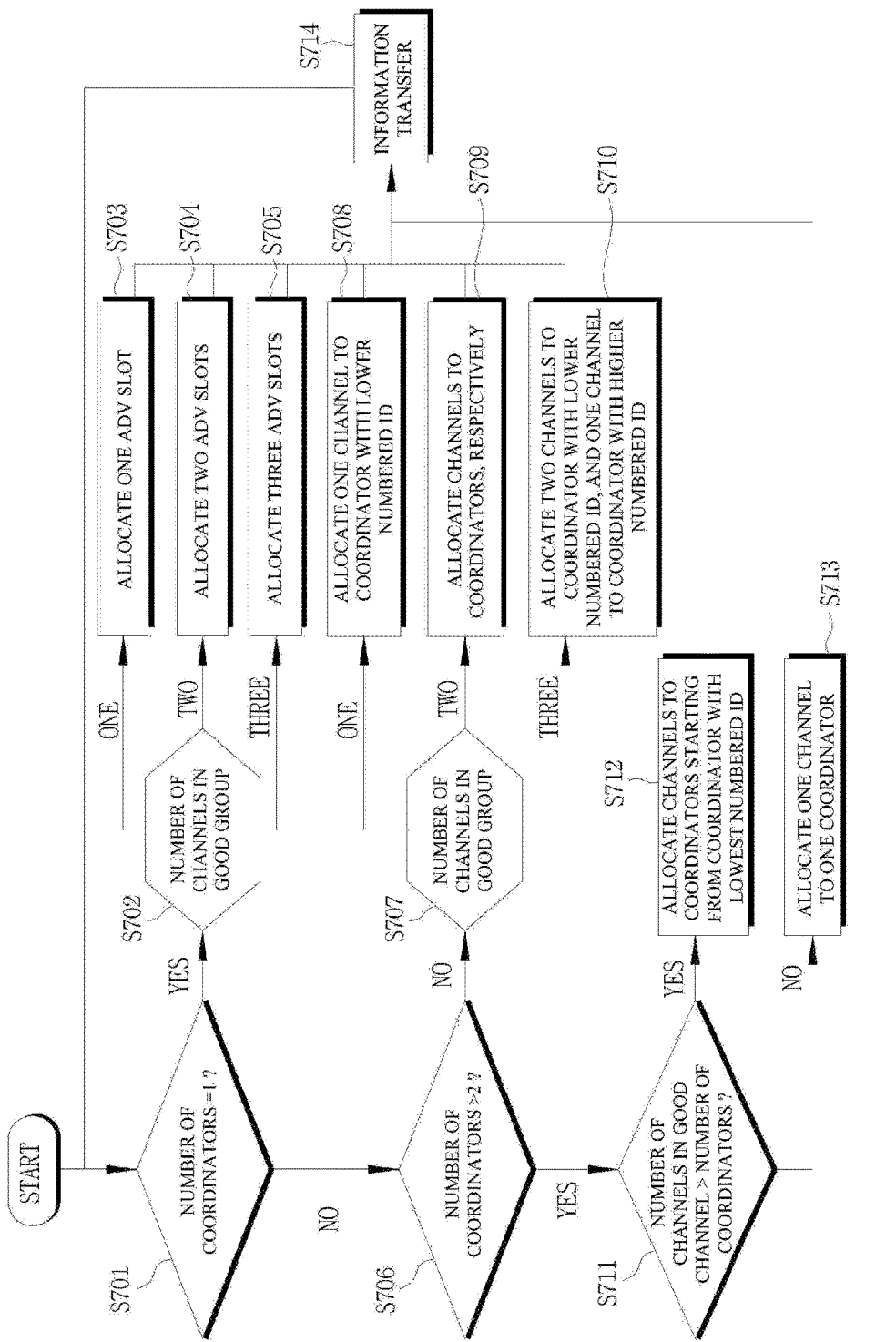
FIG. 8 is a flowchart showing a fast synchronization scheduling method for TSCH applied in a PAN coordinator in a congested industrial wireless network environment according to an embodiment of the present invention.

FIG. 8 is a flowchart showing a fast synchronization scheduling method for TSCH applied in a PAN coordinator in a congested industrial wireless network environment according to an embodiment of the present invention.

Referring to FIG. 8, when it is determined that the number of coordinators calculated by the coordinator number calculating module 420 is one (S701), the good group channel calculating module 430 calculates the number of channels classified as being part of a good group on the basis of the CQE value (first calculation) (S702).

When the number of channels obtained as a result of the first calculation is in the range of one to three, channels (ADV slots) are allocated in a number corresponding to the number of channels obtained as the result of the first calculation (S703, S704, S705), and information about the allocation is delivered to the coordinator (S714). In this case, when the number of channels obtained as a result of the first calculating is four or more, three channels that are ranked as the three channels with the highest qualities, (that is, highest CQE values) among the four channels are allocated to the coordinator, and information about the allocation is delivered to the coordinator. Thus, a single coordinator is able to transmit an ADV message in different channels according to the situation.

Then, when it is determined that the number of coordinators calculated by the coordinator number calculating module 420 is two (S706), the good group channel calculating module 430 calculates the number of channels classified as being part of a good group on the basis of the CQE value (second calculation) (S707).

When the number of channels obtained as a result of the second calculation is one, the channel (an ADV slot) is allocated to a coordinator with a lower numbered coordinator ID (S708), and information about the allocation is delivered to the coordinator (S714). In this case, since coordinator IDs are assigned to coordinators in the order that they joined the network, there are no duplicate ID numbers, and preferably, a coordinator joining earlier is given a channel before a coordinator joining later. The following description is illustrated as allocating channels in order of lowest coordinator ID. However, the allocating of channels in order of lowest coordinator ID is merely an example, and the present invention is not limited thereto.

When the number of channels obtained as a result of the second calculating step is two, the channels are respectively allocated to the two coordinators (S709), and information about the allocation is delivered to the coordinators (S714).

When the number of channels obtained as a result of the second calculating step is three, two of the channels are allocated to a coordinator with a lower numbered coordinator ID, the one remaining channel is allocated to the remaining coordinator (S710), and information about the allocation is delivered to the coordinators (S714). When the calculated number of channels is four or more, three channels that are ranked the three channels with the highest qualities (highest CQE values) among the four channels are allocated to the coordinator in the same manner as the above, and the remaining channel is not used.

Finally, when it is determined that the number of coordinators calculated by the coordinator number calculating module 420 is three or more, the number of coordinators is compared with the number of channels in the good group (S711).

As a result of the comparison in Operation S711, when the number of the channels in the good group is smaller than the number of the coordinators, the channels in the good group are allocated to the coordinators in order of lowest numbered coordinator ID (S712), and information about the allocation is delivered to the coordinators (S714).

As a result of the comparison in Operation S711, when the number of the channels in the good group is larger than or equal to the number of the coordinators, one channel is allocated to one coordinator such that ADV messages are simultaneously transmitted in a plurality of channels (S713), and information about the allocation is delivered to the coordinators (S714).

Figure 9:
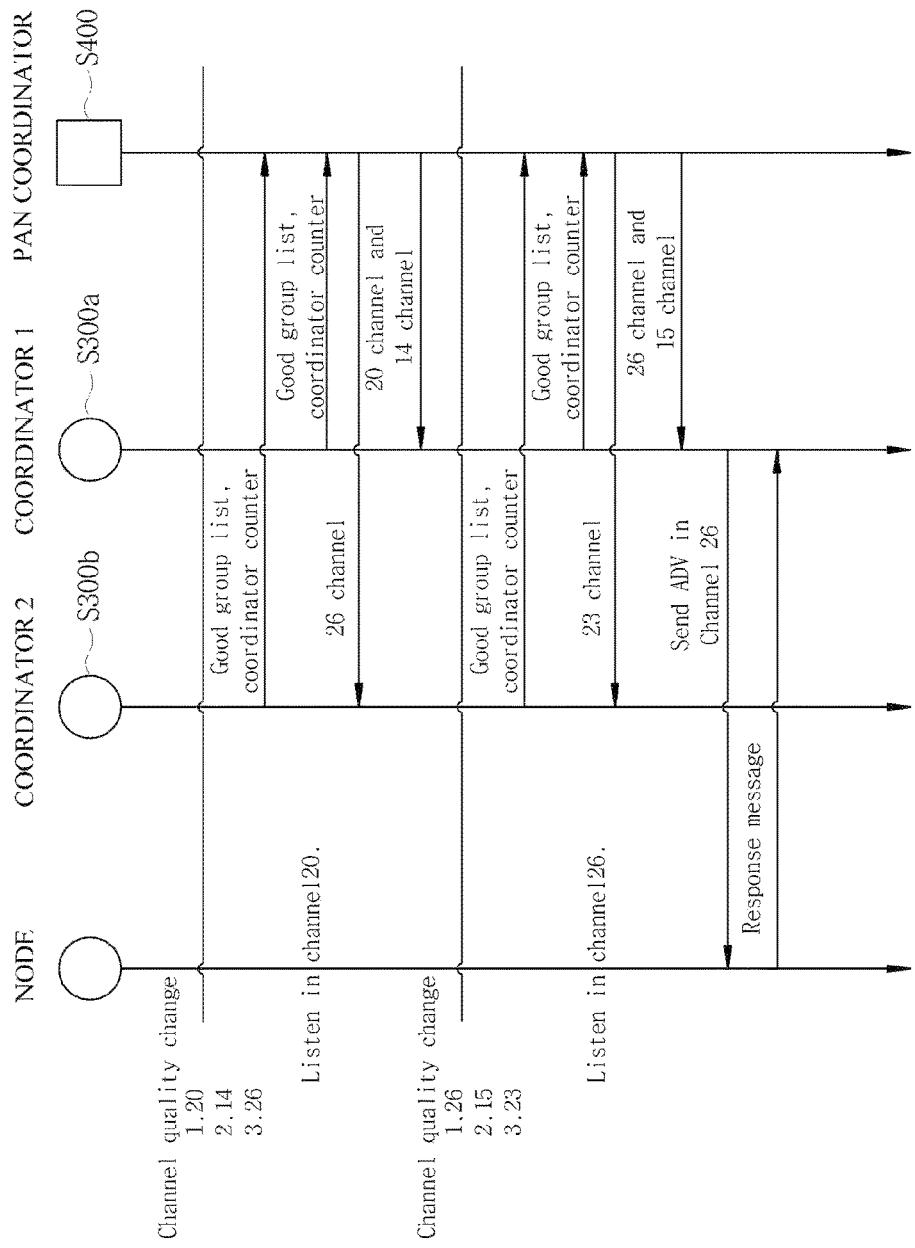
FIG. 9 is a flowchart showing a scheduling method for a fast synchronization scheduling method for TSCH in a congested industrial wireless network environment, in which first to third embodiments of the present invention are applied.

FIG. 9 is a flowchart showing a scheduling method for a fast synchronization scheduling method for TSCH in a congested industrial wireless network environment, in which first to third embodiments of the present invention are applied.

Referring to FIG. 9, the following description first assumes that the PAN coordinator 400, two coordinators (a first coordinator (ID:1) and a second coordinator (ID:2)), and one node desire to join.

In this case, channels number 14, number 20, and number 26 have been subject to a change in quality, and are ranked in the order of the channel number 20, the channel number 14, and the channel number 26 on the basis of highest channel quality. In this case, the node desiring to join listens to an ADV message in the channel number 20, which has the highest channel quality.

The coordinators 300a and 300b deliver information about the qualities of the channels that they measured by themselves and information about nearby coordinators to the PAN coordinator 400, and are assigned channels. For reference, assuming the above described, the first coordinator 300a has an ID with a number lower than that of the second coordinator 300b, such that the first coordinator 300a is assigned the higher ranked two channels having good quality.

With changes circumstance, the channels are subject to changes in quality, and are differently ranked in the order of the channel number 26, the channel number 15, and the channel number 23. Accordingly, the node desiring to join listens to an ADV in the channel number 26, which has the highest quality, and the coordinators 300a and 300b deliver information about the qualities of the channels that they measured by themselves and information about nearby coordinators to the PAN coordinator 400, and are assigned channels according to the algorithm.

As shown in FIG. 9, the first coordinator 300a is assigned the channel number 26 and the channel number 15, and the second coordinator 300b is assigned the channel number 23.

Accordingly, the first and second coordinators 300a and 300b send ADV messages in the respective channels assigned thereto, and the node having received the ADV message joins the network.

Although the present invention has been particularly described with reference to exemplary embodiments, it should be understood by those of skilled in the art that the embodiments disclosed above should be considered in a descriptive sense only and not for purposes of limitation. In addition, it should be understood that various embodiments are possible within the scope of the following claims. Therefore, the scope of the invention is defined not by the detailed description of the invention but by the appended claims, and encompasses all modifications and equivalents that fall within the scope of the appended claims and will be construed as being included in the present invention.

INDUSTRIAL APPLICABILITY

The present invention relates to a Time Slotted Channel Hopping (TSCH), which is a Time Division Multiple Access (TDMA)-based Medium Access Control (MAC) protocol, and more particularly, to a fast synchronization scheduling apparatus and method for, on the basis of congestion of a network, an arrangement state of nodes, and a quality of a communication channel, reducing a listening time of a node that desires to join.

What is claimed is:

1. A fast synchronization scheduling method for Time Slotted Channel Hopping (TSCH) in a congested industrial wireless network environment, the fast synchronization scheduling method comprising steps of:
   (a) receiving RF signals from nearby channels;
   (b) receiving advertisement packets (ADVs) and received signal strength indicator (RSSI) values from the RF signals and measuring Channel Quality Estimation (CQE) values of the respective channels by putting the RSSI values of the respective channels into a CQE formula, and collecting information about a number of coordinators and information about a good group; and
   (c) delivering the information about the number of coordinators and a number of allocated ADV slots to a Personal Area Network (PAN) coordinator on the basis of the information about the number of the coordinators and the information about the good group that are collected from the step (b), and upon receiving an answer, generating an ADV message and transmitting the generated ADV message in a channel designated for each coordinator.

2. The fast synchronization scheduling method of claim 1, wherein the step (b) further comprises:
   storing the received RSSI values;
   identifying a number of other coordinators;
   sorting the channels in order of highest CQE value (highest channel quality) based on the measured CQE values; and
   setting the number of coordinators and the good group by using the ADVs, the number of coordinators, and the CQE values that are identified, and selecting channels having a high CQE value.

3. The fast synchronization scheduling method of claim 2, wherein the step (b) further comprises:
   selecting, on the basis of a predetermined threshold value, a channel that is determined not to be congested among the channels sorted in order of highest CQE value.

4. The fast synchronization scheduling method of claim 1, wherein the PAN coordinator serves to perform, on an entire topology that accords with allocation of ADV slots, scheduling on the basis of the good group and the number of coordinators.

5. A fast synchronization scheduling method for Time Slotted Channel Hopping (TSCH) in a congested industrial wireless network environment, the fast synchronization scheduling method comprising:
   (a) receiving information about a good group and information about the number of nearby coordinators with respect to each coordinator;
   (b) calculating the number of coordinators that share a communication distance with each coordinator on the basis of the information received in step (a);
   (c) calculating a number of channels classified as being part of the good group on the basis of a Channel Quality Estimation (CQE) value included in the information; and
   (d) comparing the number of channels classified as being part of the good group with the calculated number of the coordinators, allocating a channel to each coordinator on the basis of a result of the comparison, and delivering the information about the allocation to each coordinator in a wireless manner.

* * * * *